United States Patent [19]

Shen et al.

[11] Patent Number: 4,629,316

[45] Date of Patent: Dec. 16, 1986

[54] ATTENUATION ACROSS OPTICAL FIBER SPLICE

[75] Inventors: Nelson M. Shen, San Jose; Robert Zimmerman, Mountain View, both of Calif.

[73] Assignee: Raychem Corporation, Menlo Park, Calif.

[21] Appl. No.: 545,413

[22] Filed: Oct. 25, 1983

[51] Int. Cl.⁴ ............................................. G01N 21/84
[52] U.S. Cl. .................................................... 356/73.1
[58] Field of Search ............................ 356/73.1, 434; 350/96.15, 96.21

[56] References Cited

FOREIGN PATENT DOCUMENTS 151455  11/1979  Japan ................................ 350/96.21

OTHER PUBLICATIONS

Kato et al., "New Optical Monitoring Method for Arc Fusion Splice of Single-Mode Fibres & High-Precision Estimation of Splice Loss", Electronics Letters, 28 Oct. 1982, vol. 18, #22, pp. 972-973.

*Primary Examiner*—Vincent P. McGraw
*Attorney, Agent, or Firm*—Dennis E. Kovach; T. Gene Dillahunty

[57] ABSTRACT

This invention provides a method and apparatus for making certain measurements across a splice of a first optical fiber and a second optical fiber, then calculating the actual decibel attenuation across the splice for optical signals transmitted through the fibers during actual use. The method of this invention involves measuring the optical power $P_2$ in the second fiber with the fiber ends separated longitudinally a certain distance, then measuring the optical power $P_1$ in the second fiber with the fiber ends positioned close together for effecting the splice. The attenuation is calculated from the formula $$dB = 10 \log(P_1/RP_2)$$

where R is a predetermined constant for the fibers being spliced.

16 Claims, 2 Drawing Figures

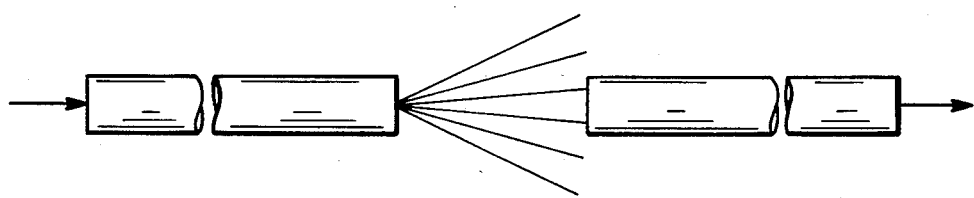
*FIG_1*
*FIG_2*

ATTENUATION ACROSS OPTICAL FIBER SPLICE

BACKGROUND OF THE INVENTION

1. Field of the Invention

This invention relates to methods and apparatus for determining the actual decibel attenuation across an optical fiber splice. This invention enables the craftsman splicing the optical fibers in the field to determine at the time the splice is made whether the splice has acceptable attenuation for actual use.

2. Introduction to the Invention

The most widely used optical fibers comprise a glass core, a glass cladding which surrounds the core and a buffer which surrounds the cladding and is composed of a relatively soft polymeric material. Where reference is made in this specification to an "optical fiber," it is to be understood that the fiber referred to is one comprising a glass core, a glass or plastic cladding and a buffer. The buffer protects the cladding and the core and allows the fiber to be bent into and maintained in a bend of substantially smaller bend radius than would otherwise be possible. The buffer may be surrounded by a jacket. Optical signals are conventionally fed into optical fibers by directing them axially at the exposed fiber end. It is also known to feed an optical signal into a fiber through the side of the cladding or buffer. The buffer of the fiber is retained. The light is launched through the buffer and cladding and then into the core of the fiber.

It is often desirable to bring two optical fibers into precise axial alignment, so that a signal can be passed from one fiber to the other with minimum of loss. It is generally desirable to join the fibers together into a permanent joint, called a splice. An optical fiber may be spliced to another optical fiber either by fusing the fibers together or by adhering them together with an index-matching adhesive, i.e., an adhesive whose refractive index is chosen so that signal loss is minimized. Alternatively, the splice can be made reversable by joining the fibers together with a thermoplastic index-matching material which can be heated to allow the fibers to be inserted and aligned within the material, cooled to solidify, and form the splice then can be heated to remove the fibers again. The index-matching adhesives referred to above are generally curable adhesives which are cured chemically or with ultra-violet light. This invention can be used in all these methods of splicing optical fibers as well as in mechanical methods of splicing optical fibers.

The known methods for splicing optical fibers suffer from various disadvantages. In the field, optical fibers are frequently furnished in two kilometer lengths which are then spliced together to form a continual optical fiber of the required length. Using end launch light to optimize the splice is impractical because the light must be launched in the end of the first fiber at least two kilometers away from the splice and the light must be read at the other end of the second fiber at least two kilometers in the opposite direction. The person performing the alignment of the fibers and effecting the splice must be in communication with and respond to directions from the other persons at the ends of the first and second fibers. An OTDR (optical time domain reflectometer) can also be used to determine a splice loss, but OTDR requires one person at the light launch/light read site at the end of the fiber and another person to make the splice and requires communication between these persons usually at least one or two kilometers apart.

A more practical splicing method has been developed and is described in copending application U.S. Ser. No. 437,053 filed Oct. 27, 1982, which is a continuation-in-part of copending application U.S. Ser. No. 370,321 filed Apr. 21, 1982, (now abandoned) which is a continuation-in-part of U.S. Ser. No. 258,079 filed Apr. 27, 1982, now abandoned. The disclosures and drawings of these copending cases are incorporated herein in their entirety by reference. The method and apparatus of the present invention is particularly applicable to the disclosure in said copending cases. In said copending cases, light is side launched into the first fiber near the splice and detected through a side exit from the second fiber, also near the splice. The person performing the splice controls the light launch, reads the detector and can manually or automatically optimize the amount of light passing through the splice before the adhesive is cured. This method is very effective for obtaining the best splice for a given pair of fibers and given adhesive. However, method of said copending cases does not provide a way for determining what the actual or absolute attenuation or loss across the final splice will be.

It is important to be able to determine the actual or absolute loss of each splice at the time it is made. Until now, the determination of the actual loss across a splice was through the end launch and end read method or through use of an OTDR. These methods are impractical in many applications because it involves detecting a signal at least a kilometer from the splice, comparing the signal to the light launched into the fiber at least one kilometer in the other direction from the splice, and communicating the results to the person performing the splice. If the splice has excessive loss, it must be removed and the splice re-done.

DESCRIPTION OF THE DRAWINGS

FIGS. 1 and 2 illustrate a method of the invention whereby light is injected into a first fiber whose end is in substantial axial alignment and separated from an end of a second fiber a distance $D_2$, with FIG. 2 showing the fiber arrangement for splicing.

DESCRIPTION OF THE INVENTION

This invention provides a method and apparatus for determining attenuation across an optical fiber splice between a first fiber and a second fiber. The method comprises launching an optical signal into the first fiber, positioning the fiber ends in substantial axial alignment at distance $D_2$ and measuring the optical power of the optical signal $P_2$ in the second fiber, positioning the fiber ends in substantial axial alignment at a distance $D_1$, at which the fiber ends are positioned for splicing, and measuring the optical power of the optical signal $P_1$ in the second fiber, and calculating the attenuation from the formula:

$$dB = 10 \log (P_1/RP_2) \qquad (I)$$

where R is a predetermined constant for the optical fiber and where $D_2$ is greater than $D_1$. In the practice of this invention, the optical signal launched into the first fiber may be launched in the end of the first fiber or may be side launched into the fiber through the use of an optical coupling means at a bend in the fiber as described in the above copending case U.S. Ser. No. 437,053 and the parent applications thereof. Whether the optical signal in the first fiber is end launched or side launched does not affect the performance of the method of this invention so long as the actual signal is of sufficient optical power to pass from the end of the first fiber into the second fiber and is of sufficient optical power to be measured in the second fiber.

Positioning the fiber in substantial axial alignment at a distance $D_2$ for measuring the optical signal $P_2$ in the second fiber may be done in any conventional manner. This positioning may be accomplished by using a V-groove optical fiber holder in which the two fibers are placed in the bottom of the groove and positioned at the required distance $D_2$ until the optical signal $P_2$ is measured in the second fiber. The fiber may also be positioned in proper alignment by holding the first fiber in a chuck having a V-groove which holds the fiber for alignment of the fiber in the X, Y and Z axes by the movement of the chuck. The second fiber may be clamped in a similar chuck which may or may not be movable. The fibers can then be aligned visually under appropriate magnification or can be aligned by optimizing the light passing from the first fiber into the second fiber. Other methods of positioning the fibers at the distance $D_2$ will be apparent to one skilled in the art. It has been found that the optical power of the optical signal received by the second fiber is relatively constant at a distance of $D_2$, due to the divergence and redistribution of the light emerging from the end of the first fiber, so long as the lateral misalignment is less than about ±20 microns.

Measurement of the optical power of the optical signal $P_2$ in the second fiber may likewise be done in any conventional manner such as measuring the optical signal at the end of the second fiber or by withdrawing the signal through the side of the fiber by use of an optical coupler at a bend in the fiber as described in above copending application U.S. Ser. No. 437,053. The use of any conventional measurement technique to measure $P_2$ at $D_2$ will be apparent to one skilled in the art.

Positioning the fiber ends at distance $D_1$ and measuring the intensity of the optical signal $P_1$ in the second fiber are performed the same way, respectively, as described above with respect to positioning the fibers at distance $D_2$ in measuring the intensity of optical signal $P_2$. The measurement of $P_1$ and $P_2$ should be done in the same way with the same instrument.

The source of the optical signal launched into the first fiber may be any conventional signal-generating means such as a laser or a light-emitting diode. The type of optical signal launched into the first fiber is not important so long as the signal can be transmitted into the second fiber and measured in the second fiber at the two positions $D_1$ and $D_2$ as described above. The signal should be of sufficient optical power to allow convenient quantitative measurement of the optical power of the optical signal in the second fiber. It is not necessary for the practice of this invention to know the intensity of the optical signal launched into the first fiber for purposes of measuring $P_1$ and $P_2$ in the second fiber. The optical power of $P_1$ and $P_2$ should be high enough that they can be measured with a sufficient degree of accuracy. In a single mode fiber splice, the attenuation should be measured at the wavelength appropriate for the fiber and its use, for example, at 1.3 micron wavelength or at 0.85 micron wavelength. If other wavelengths of sources are used, calibration factors have to be determined in order to have a precise measurement of attenuation.

It is a necessary aspect in the practice of this invention that the distance between the fiber ends $D_2$ for the measurement of $P_2$, be a sufficiently large distance. The light emerging from a fiber end is divergent and redistributing. If the fiber ends separation is sufficiently large, the optical intensity seen by the second fiber is relatively uniform. Therefore, precise measurement of $P_2$ is possible even at moderate lateral misalignment discussed above.

Distance $D_2$ can range from 50 microns to 500 microns depending on the optical fibers being used and depending on the sensitivity of the measurement of $P_2$ compared to $P_1$. It has been found that $D_2$ is generally preferred to be about 100 microns and about 300 microns and for some optical fibers $D_2$ is most preferably between about 200 and 220 microns.

Distance $D_1$ can range from 0 to about 50 microns. While it is possible to have the fiber ends touching for completion of the splice, thus having $D_1$ equal 0, it is generally not desirable because it is difficult to accurately position the fiber ends if they are touching. Distance $D_1$ is usually determined by finding the distance between the fiber ends which gives the optmimum splice performance. In general, it is preferred that $D_1$ be less than 20 microns and it is most preferred that $D_1$ be about 10 microns or less.

The predetermined constant R, for the optical fiber being spliced is determined from the formula:

$$R=(P/P_R) \tag{II}$$

where P is the optical power of an optical signal in the first fiber and $P_R$ is the optical power of the resultant optical signal in the second fiber transmitted from the first fiber when the ends are substantially axially aligned and positioned at a distance $D_3$. In determining constant R for a given type of optical fiber, it is convenient to use a short sample of the same type fiber for determining the constant R. It is not necessary to know the optical power of the optical signal launched into the sample portion of the optical fiber, but it is necessary to measure the optical power of the optical signal at the output end of the sample portion of the optical fiber. The sample portion of the optical fiber is then broken and the two parts of the sample fiber are aligned and positioned at a distance $D_3$ at which the optical power of the optical signal in the second fiber is measured. Alternatively, it is convenient in the practice of this invention to first break the sample portion of the optical fiber into a first fiber and second fiber. The optical power of the optical signal from the output end of the first fiber, P, is measured, the first fiber and second fiber positioned at a distance $D_3$, aligned and the optical power of the optical signal in the second fiber is measured, $P_R$.

It is preferred that the predetermined constant R be calculated from light measurement $P_R$ at distance $D_3$ where $D_3$ is equal to distance $D_2$. Thereby constant R determined from the formula $$R=(P/P_R)$$

can be directly used in the above formula (I) without adjustment. However, this invention can also be practiced where R is determined by measurements of $P_R$ at a distance $D_3$ which is different than distance $D_2$. When distance $D_3$ is different from distance $D_2$, constant R determined at a distance of $D_3$ can be adjusted for use with the measurements and calculations at distance $D_2$ by adjusting R by reference to the chart at page 310 of *Optical fibers for Transmission*, John E. Midwinter, John Wiley & Sons, Inc., 1979, for singlemode fibers and the chart at page 175 of *Fundamentals of Optical Fiber Communications*, Second Edition, Michael K. Barnoski, Academic Press, 1981, for multimode fibers. These adjustments are made emperically.

It is also preferred to determine constant R with the same type of light launch as will be used in measuring $P_1$ and $P_2$ in the attenuation measurement and calculation according to this invention. Thus, if side launch light source is to be used in measuring $P_1$ and $P_2$ for determination of attenuation, it is preferred that constant R be determined from the same type of fiber also using side launch light source. However, constant R determined under one set of conditions can be calibrated for use in the method and calculation according to this invention under another set of conditions through emperical determinations.

It will be noted that the attenuation calculated according to this invention may be slightly higher in some cases than the actual attenuation experienced over the optical fiber splice in the transmission of conventional optical signals such as telecommunication optical signal. This is due to the fact that using side launch optical signal source for determining constant R and in measuring $P_1$ and $P_2$, has a fairly consistent profile across the diameter of the optical fiber. In conventional or commercial transmission of optical signals such as telecommunication signals which are end launched into the fiber, the profile of the optical signal tends to be more concentrated towards the core of the fiber. Therefore, slight attenuation measured and calculated at the edges of the optical fiber in the practice of the present invention may not appear as significant attenuation of an end launched telecommunications signal which is more concentrated in the core of the fiber.

In the measurement of $P_R$ for predetermining the constant R and for the measurement of $P_2$, the first fiber and the second fiber should be substantially axially aligned but at distances of up to 500 microns for $D_2$ or $D_3$. Slight lateral misalignment of the first fiber and the second fiber will not significantly affect the power or intensity of the optical signal received by the second fiber. It has been found that the intensity of the optical signal received by the second fiber is relatively constant at a distance of $D_2$ of $D_3$ so long as the lateral misalignment is less than about ±20 microns.

DESCRIPTION OF A PREFERRED EMBODIMENT

In a preferred method of practicing this invention, a graded index optical fiber was used which is available from Corning glass under the trade designation Glass Code 1516, which is an optical fiber having a glass core of diameter 50 microns, a glass cladding of an outer diameter of 125 microns and a polyacrylate buffer of outer diameter 250 microns. In the practice of this invention, the buffer was stripped from the fiber and the stripped fiber ends were cleaved to provide a clean, square, mirror end surface. Each of the fiber ends was then secured in a V-groove movable chuck. The first fiber was connected to an optical coupler at a bend in the fiber whereby light could be launched into the side of the optical fiber and the second fiber was connected to an optical coupler at a bend in the fiber whereby light could be withdrawn from the fiber and detected by a detector for measurement of optical power of the optical signal withdrawn. The ends of the first fiber and second fiber were each inserted into opposite ends of a small UV transparent tube containing a small amount of UV curable acrylic adhesive. The ends of the fibers were positioned at distance $D_1$, 10 microns, and positioned to optimize the optical signal intensity received by the second fiber. The fibers are then backed off to a distance $D_2$, 210 microns while maintaining the axial alignment of the first fiber in the second fiber. An optical signal of a constant intensity was launched into the first fiber and $P_2$ is measured by withdrawing the signal at the optical coupler on the second fiber. The fibers were then moved to close the distance back to $D_1$, 10 microns, and again positioned to optimize the optical power of the optical signal received in the second fiber. UV source was radiated on the acrylic adhesive to cure the adhesive. $P_1$ was measured after the adhesive was cured. In this example, the optical power of the optical signal at $P_1$ was 46.0 at $P_2$ was 22.1. Using the formula to calculate the attenuation:

$$dB = 10 \log \frac{46.0}{2.45 (22.1)} = 0.71$$

the actual attenuation or loss for this splice measured by a conventional method was 0.73, which gave an error between the calculated loss according to this invention and the measured by conventional method loss of 0.02 dB. The constant R was predetermined according to the description of this invention for the above fiber and was determined to be 2.45.

The Apparatus

The apparatus provided for by this invention comprises means for holding and pecisely positioning the end of one optical fiber relative to the end of the other optical fiber, means for launching an optical signal into the first fiber, means for measuring the optical signal in the second fiber, means for aligning the fiber ends actually, means for positioning the fiber ends at a distance $D_2$ and measuring the optical signal $P_2$ in the second fiber, means for positioning the fiber ends at a distance $D_1$ and measuring the signal $P_1$ in the second fiber and means for calculating the attenuation across the optical fiber splice using the formula dB equal 10 log $P_1$ over $RP_2$ where R is a predetermined constant for the optical fiber. It is preferred that the means for launching the optical signal into the first fiber is an optical coupler capable of side launching the optical signal at a bend in the fiber and the means for measuring the optical signal in the second fiber is likewise an optical coupler capable of withdrawing the signal from the second fiber at a bend in the fiber.

Although this invention has been discussed in detail with respect to a certain preferred embodiment, it is to be understood that its scope is not limited to that embodiment but only by the appended claims and their reasonable equivalents.

We claim:

1. A method for determining attenuation across an optical fiber splice between a first fiber and a second fiber, comprising the steps of:
    launching an optical signal into the first fiber;
    positioning ends of the fibers in substantial axial alignment at a distance $D_2$ and measuring an optical power $P_2$ of an optical signal in the second fiber;
    positioning the fiber ends in substantial axial alignment at a distance $D_1$ at which the fiber ends are positioned for splicing and measuring an optical power $P_1$ of an optical signal in the second fiber; and calculating the attenuation from the formula $$dB = 10 \log (P_1/RP_2)$$

wherein R is determined from P and $P_R$;

where P is an optical power of a second optical signal in a sample fiber and $P_R$ is an optical power of the second optical signal in the sample fiber when two parts thereof are substantially axially aligned and are positioned at a distance $D_3$, the second signal being injected into the sample fiber, $D_2$ and $D_3$ being greater than $D_1$.

2. A method according to claim 1 wherein $D_3$ equals $D_2$.

3. A method according to claim 1 wherein $P_1$ is measured before the splice is completed.

4. A method according to claim 2 wherein $P_1$ is measured before the splice is completed.

5. A method according to claim 1 wherein $P_1$ is measured after the splice is completed.

6. A method according to claim 2 wherein $P_1$ is measured after the splice is completed.

7. A method according to claim 1 wherein $D_1$ is 0 to about 50 microns and $D_2$ is about 50 microns to about 500 microns.

8. A method according to claim 2 wherein $D_1$ is 0 to about 50 microns and $D_2$ is about 50 microns to about 500 microns.

9. A method according to claim 1 wherein $D_1$ is 0 to about 20 microns and $D_2$ is about 100 microns to about 300 microns.

10. A method according to claim 2 wherein $D_1$ is 0 to about 20 microns and $D_2$ is about 100 microns to about 300 microns.

11. A method according to claim 1 wherein the fiber ends are positioned in substantial axial alignment by moving at least one of the fiber ends to maximize the optical signal in the receiving end.

12. A method according to claim 2 wherein the fiber ends are positioned in substantial axial alignment by moving at least one of the fiber ends to maximize the optical signal in the receiving end.

13. A method according to claim 1, the distance $D_2$ being sufficiently large that variations in $P_2$ are small for moderate lateral misalignments between ends of the first and second fibers, the lateral misalignment being as large as 20 micrometers.

14. Apparatus for measuring an optical signal across an optical fiber splice between a first optical fiber and a second optical fiber and calculating the attenuation of the splice, comprising:

means for holding and precisely positioning an end of the first fiber relative to an end of the second fiber for splicing;

means for launching an optical signal into the first fiber;

means for measuring the optical signal in the second fiber;

means for aligning substantially axially the fiber ends;

means for positioning the fiber ends at a distance $D_2$ and measuring optical signal $P_2$ in the second fiber;

means for positioning the fiber ends at a distance $D_1$ and measuring optical signal $P_1$ in the second fiber; and means for calculating the attenuation across the optical fiber splice using the formula $$dB = 10 \log (P_1/RP_2)$$

where R is a predetermined constant determined from P and $P_R$, P being an optical power of a second optical signal measured in a sample fiber of a type similar to the first fiber, and $P_R$ is an optical power of the second optical signal measured in the sample fiber when two parts thereof are substantially axially aligned and are positioned at a distance $D_3$, P and $P_R$ being created by launching the second signal into the sample fiber, $D_2$ and $D_3$ being greater than $D_1$.

15. Apparatus of claim 14 wherein the means for launching an optical signal into the first fiber is an optical coupler capable of side launching the optical signal into the fiber through the cladding of the fiber.

16. Apparatus of claim 15 wherein the means for measuring the optical signal in the second fiber is an optical coupler capable of withdrawing the optical signal through the cladding of the fiber.

* * * * *